March 29, 1938.  J. EDGAR  2,112,455

HOB AND METHOD OF MAKING SPLINE COUPLINGS

Filed July 28, 1932   3 Sheets-Sheet 1

INVENTOR
John Edgar
BY
Chindahl, Parker & Carlson
ATTORNEYS

March 29, 1938. J. EDGAR 2,112,455
HOB AND METHOD OF MAKING SPLINE COUPLINGS
Filed July 28, 1932  3 Sheets-Sheet 2
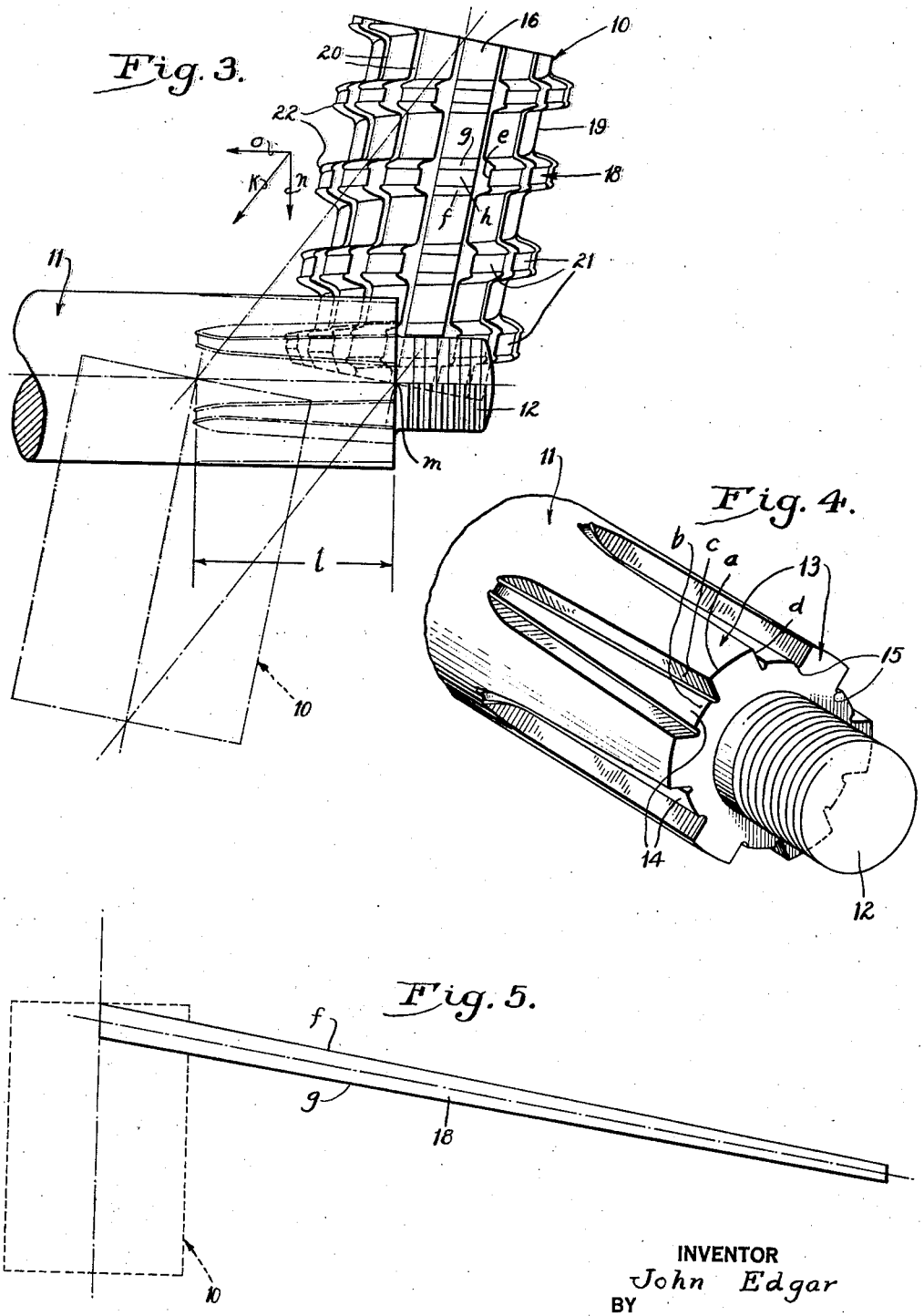
INVENTOR
John Edgar
BY
Chindahl, Parker & Carlson
ATTORNEYS March 29, 1938.  J. EDGAR  2,112,455
HOB AND METHOD OF MAKING SPLINE COUPLINGS
Filed July 28, 1932  3 Sheets-Sheet 3

INVENTOR
John Edgar
BY
Chindahl, Parker + Carlson
ATTORNEYS

Patented Mar. 29, 1938

2,112,455

UNITED STATES PATENT OFFICE 2,112,455

HOB AND METHOD OF MAKING SPLINE COUPLINGS

John Edgar, Rockford, Ill., assignor to Barber-Colman Company, Rockford, Ill., a corporation of Illinois Application July 28, 1932, Serial No. 625,290

9 Claims. (Cl. 90—4)

The present invention relates to improvements in hobs for generating longitudinal keys on the inside member, such as a shaft, of a spline coupling.

The primary objects of the present invention reside in the provision of a new and improved hob and method for making a spline coupling comprising an inside member having generally longitudinal integral generated keys tapered in width, with at least one side of each key helicoidal in form.

Further objects and advantages will become apparent as the description proceeds.

In the accompanying drawings, Figure 1 is a side elevational view of a hob embodying the features of my invention, the hob being shown in the position it occupies relative to a spline shaft, illustrated in dotted outline at the start of the cutting operation, and in full outline near the end of the cutting operation.

Fig. 3 is a diagrammatic view illustrating the method of forming the spline shaft with the hob.

Fig. 4 is a fragmentary perspective view of the spline shaft generated by the hob.

Fig. 5 is a diagrammatic view illustrating the form of the hob thread.

Figure 1:
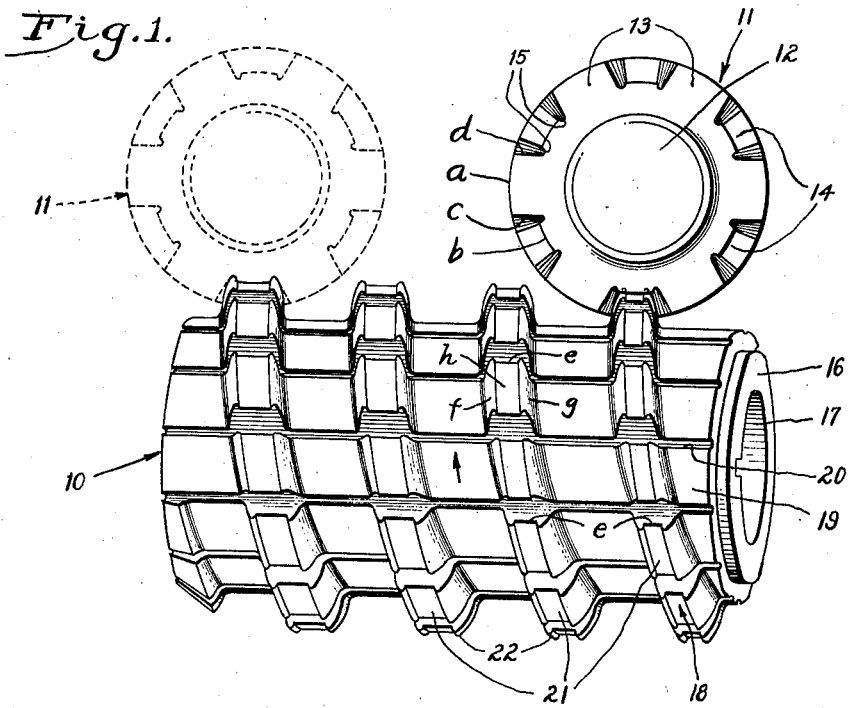
Figure 2:
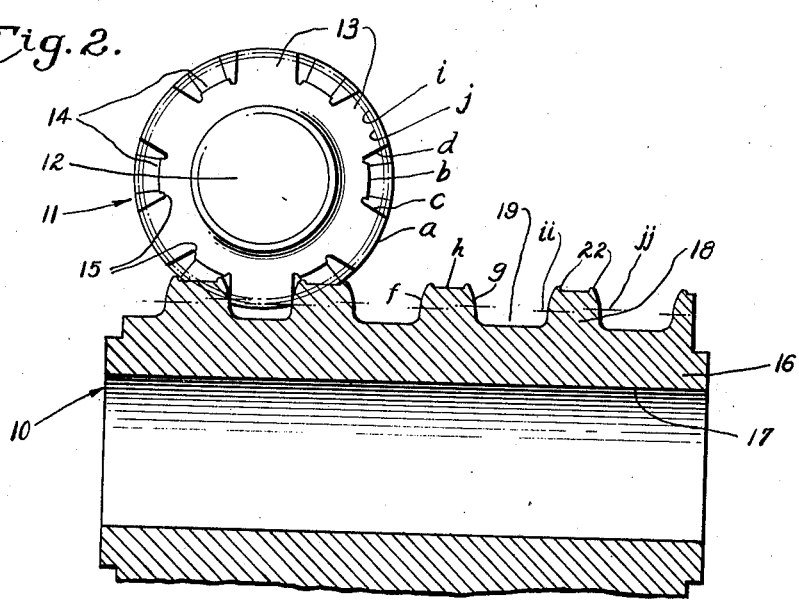
Fig. 2 is a fragmentary axial sectional view of the hob shown in operative relation to the spline shaft.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the hob 10 constituting the exemplary embodiment of the invention is adapted to generate the inside member of a spline coupling more fully disclosed in my copending application, Serial No. 620,449, filed July 1, 1932 (Patent No. 2,038,554). In the present instance, the inside member is shown as one end of a shaft 11 (see Fig. 4) adapted to interfit with an outside member, such as the hub of a gear (not shown). The end of the shaft 11 is formed with a reduced threaded extension or stud 12 adapted to receive a suitable nut (not shown) for securing the members in assembled relation.

Formed integrally with the end of the shaft 11 are a plurality of generally longitudinal spline keys 13 separated by interdental spaces 14. The keys 13 are alike in form and preferably located in uniformly spaced relation about the shaft 11, and, as viewed from the free end of the inside member, comprise tops or outer faces $a$, bases $b$ and left and right sides $c$ and $d$.

In the present instance, the tops $a$ of the keys 13 are cylindrical segments of uniform radius and concentric to the axis of the shaft 11 throughout their length, and preferably are coincident with the cylindrical projection of the shaft.

It will be evident that the bases $b$ of the keys 13 constitute the roots of the interdental spaces 14. The roots $b$ in any transverse plane are arcuate in form and segments of a circle concentric to the axis of the shaft 11. In the form of inside member illustrated in Figs. 1 to 5, the roots $b$ are parallel to the axis of the shaft 11, and hence define a cylindrical base for the keys 13. Consequently, the keys 13 are uniform in height throughout their effective length. However, in the modified form of Figs. 6 and 7, the roots $b$ are uniformly and similarly inclined toward the axis of the shaft 11 to define a symmetrically tapered or conical base for the keys 13. In this instance, the keys 13 are tapered gradually and uniformly in height along their length.

Figure 6:
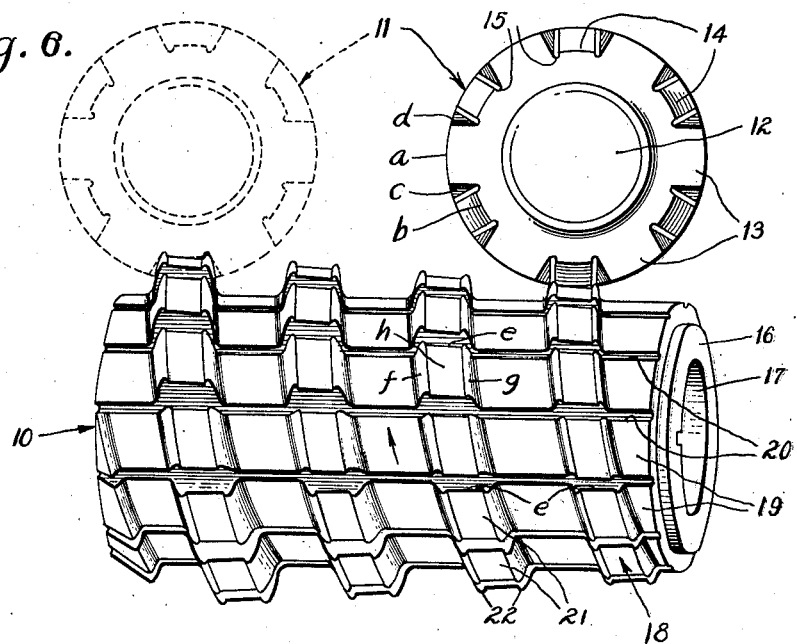
Fig. 6 is a view similar to Fig. 1 of a modified form of the hob.
Figure 7:
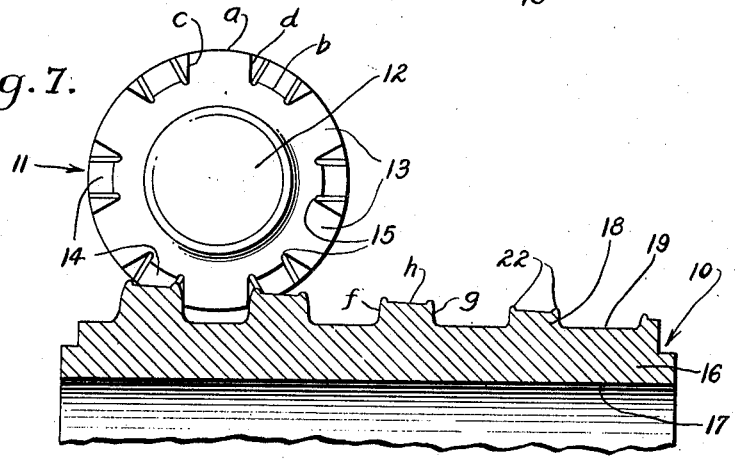
Fig. 7 is a fragmentary axial sectional view of the hob shown in Fig. 6 in operative relation to the spline shaft.

The keys 13 are uniformly tapered in width along their length so that the sides $c$ and $d$ of each key diverge and of each space 14 converge inwardly from the free end of the shaft 11. As a result, the outside member will seat on the sides of the keys 13 and will be accurately centered thereby. In the form of Figs. 6 and 7, the outside member will also seat on the roots $b$.

It will be understood that the keys 13 may be tapered in width in various ways depending on the respective inclinations of the sides $c$ and $d$. In the present instance, the sides $c$ and $d$ are shown inclined in opposite directions with leads of equal degree. Keys of this form are symmetrical with respect to a medial axial plane. The sides $c$ and $d$ also have a generatrix bearing a constant angular relation to the radial throughout the length of the keys 13, so that, with a straight line generatrix, if either side were parallel to the axis it would define a plane surface, and where the sides have a lead other than zero, as here illustrated, they define helicoidal surfaces. The helicoidal form of the sides $c$ and $d$ permit accurate interfitting with the outside member, and a good bearing along the entire length of the keys regardless of the relative axial position of the inside and outside members when in engagement.

Preferably, clearance slots 15 are formed in the spaces 14 at the longitudinal margins of the roots $b$ to depress the curved junctures, resulting from the hobbing method, between the sides c and d of the keys 13 and the roots b so that the sharp edges of the projections on the outside member (not shown) will not come into interference therewith.

The hob 10 comprises generally a cylindrical body 16 having the usual axial bore 17 for the reception of the drive shaft (not shown). The hob may have any suitable number of threads, but preferably has a single thread 18 defined by a helical groove 19 and intersected by flutes or gashes 20 extending generally longitudinally of the body. The thread consists of a series of helically alined teeth 21 each of which comprises a cutting face e, sides f and g and a top h. The hob teeth 21 are backed-off to provide a suitable relief for the cutting edges. Preferably, a spiral relief is formed so that in sharpening the hob, the faces e can be ground without altering their effective cutting contour. The hob teeth 21 also are formed with a lateral contour adapted to cut any desired predetermined contour, and where the keys 13 to be generated have straight line generatrices, as illustrated herein, the sides f and g of the teeth are involutes.

The hob 10 is adapted to form the shaft 11 in a rolling generating method in which the longitudinal contour of the thread along the spiral is projected along the path of feed inclined to the axis onto an axial plane of the shaft to produce keys 13 of the desired shape. Hence, the hob 10 is a generating hob, and all of the teeth 21 along its effective length are finishing teeth, i. e. teeth determining the final contour of the work.

The hob thread 18 has a uniform pitch or lead. The opposite sides of the thread 18, however, have different leads dependent on the form of the keys 13 to be generated. More specifically, the two sides are generated on different pitch or rolling circles. Thus, in Fig. 2, i represents the pitch circle for the long lead side, and j represents the corresponding circle for the short lead side. The corresponding pitch lines on the hob are indicated respectively at ii and jj.

In the preferred manner of determining the leads of the opposite sides of the thread 18, a suitable pitch circle for the shaft 11 at the small or outer ends of the keys 13 is selected. The circumference of this circle is divided by the number of keys 13 to ascertain the mean circular pitch of the hob thread. A convenient length of hob is now selected, and is divided by the mean circular pitch to determine the number of thread convolutions. To ascertain the difference in circular pitch of the sides of the hob thread, the difference in width of the keys 13 at opposite ends is divided by the number of thread convolutions. The mean lead of the thread may be utilized as the lead for either side of the thread, in which event the other side of the thread would have a lead equal to the mean lead increased or decreased, as the case might be, by the difference in circular pitch. Preferably, however, one side has a lead equal to the mean lead plus one-half the difference in circular pitch, while the other side has a lead equal to the mean lead minus one-half said difference. As a result, the opposite sides of the thread 18 have respectively long and short leads of equal degree with respect to the mean lead. The circumferences of the pitch circles i and j, on which the sides of the thread are generated, are obtained by multiplying the respective leads for the sides by the number of keys on the shaft 11.

The hob thread 18 thus varies uniformly and symmetrically in width from end to end at an imaginary cylindrical reference surface coaxial with the hob as indicated in unwrapped development in Fig. 5.

Spaced clearance lugs 22, adapted to generate the grooves 15 and preferably uniform in width along the hob 10, are provided on the tops h along the side edges of the teeth 21.

The hob illustrated in Figs. 1 to 5 is cylindrical in form. Hence, its hob thread 18 is uniform in height from end to end. The modified form of hob illustrated in Figs. 6 and 7 is uniformly tapered externally, and hence has a hob thread uniformly tapered in depth from the wide end to the narrow end, with the tops h of the hob teeth 21 inclined laterally in axial planes of the hob into coincidence with the taper.

In carrying out the method, the hob 10 is positioned in operative relation with the end of a solid uncut shaft 11, with the wide end of the thread leading, as illustrated in full outline in Fig. 3. In so positioning the hob 10, it is adjusted angularly to locate the adjacent portion of each thread 18 parallel to the keys 13 to be cut, and preferably is located initially off the end and at one side of the shaft 11. The angular position of the hob 10 depends upon the thread angle.

The hob 10 and the shaft blank 11 are now rotated in timed relation. In the course of this timed rotation, the hob 10 is gradually fed relatively across the shaft rectilinearly in a diagonal direction indicated by the arrow k through cutting engagement into the position indicated in dotted outline in Fig. 3. The direction of cross feed is variable depending on the length l of the shaft section to be splined. The initial position of the hob 10 is determined in part by the direction of cross feed, and the relation more specifically is such that in the course of the feed, the center of the leading end of the hob will engage the center of the shaft to cut to final depth and form at the point m.

The diagonal cross feed may be resolved into two components, one perpendicular to the shaft in the direction of the arrow n, and the other longitudinally of the shaft along the arrow o. Preferably, the feed component along the arrow n is constant in speed, and the longitudinal feed component along the arrow o is variable to obtain the desired resultant.

The diagonal cross feed effects a rolling or generating action by reason of which the keys 13 and the roots b of the spaces 14 are correctly and accurately formed, and which avoids interference. As the hob axis gradually crosses the axis of the shaft along the diagonal path k, the spaces 14 are cut to full depth progressively from the outer end to the inner end of the shaft section l. The form of the thread along its length is projected along the path k onto the axial plane of the shaft 11 through which the hob is fed, and hence the form herein described is generated on the shaft.

I claim as my invention:

1. A cylindrical generating hob for generating a cylindrical spline shaft section of a predetermined length having a plurality of uniformly peripherally spaced longitudinal keys uniform in height throughout their length and symmetrically and uniformly tapered in width with inclined helicoidal sides of equal lead in opposite directions, said hob comprising a plurality of generally longitudinal gashes and a helical groove intersecting said gashes to form a thread of constant mean lead and uniform height throughout its length, the base of said thread being cylindrical, said thread comprising a plurality of convolutions of finishing teeth having spirally relieved cutting edges at the top and both sides and being uniformly tapered in width at a cylindrical reference surface intersecting said thread and coaxial with the hob, one side of said thread having a long lead and being adapted to generate on a circle of greater diameter than the pitch circle of said section, and the other side of said thread having a short lead and being adapted to generate on a circle of smaller diameter than said pitch circle, the tops of said teeth being formed along their side margins with relatively abrupt raised clearance lugs of uniform width and between said lugs being straight and parallel to the axis of rotation in any axial plane.

2. A uniformly tapered generating hob for generating a spline shaft section of a predetermined length having a plurality of uniformly peripherally spaced longitudinal keys tapered in height throughout their length and symmetrically and uniformly tapered in width with inclined helicoidal sides of equal lead in opposite directions, said hob comprising a plurality of generally longitudinal gashes and a helical groove intersecting said gashes to form a thread of constant lead, the base of said thread being cylindrical, said thread comprising a plurality of convolutions of finishing teeth having spirally relieved cutting edges at the top and both sides and being uniformly tapered in width at a cylindrical reference surface intersecting said thread and coaxial with the hob and uniformly tapered in height from end to end, one side of the thread having a long lead and being adapted to generate the final form of said section on a circle of greater diameter than the pitch circle of said section, and the other side of the thread having a short lead and being adapted to generate the final form of said section on a circle of smaller diameter than said pitch circle, the tops of the teeth being formed along their side margins with relatively abrupt raised clearance lugs of uniform width, said lugs being alined in two helices diverging along the taper of said hob, said tops of said teeth between said lugs being straight and laterally inclined in any axial plane to coincide with said taper.

3. A generating hob for generating a spline shaft section of a predetermined length having a plurality of uniformly peripherally spaced longitudinal keys symmetrically and uniformly tapered in width with inclined helicoidal sides of equal lead in opposite directions, said hob comprising a plurality of generally longitudinal gashes and a helical groove intersecting said gashes to form a thread of constant lead, said thread comprising a plurality of convolutions of finishing teeth having spirally relieved cutting edges at the top and both sides, one side of said thread having a long lead and being adapted to generate the final form of said section on a circle of greater diameter than a reference circle of said section, and the other side of said thread having a short lead and being adapted to generate the final form of said section on a circle of smaller diameter than said reference circle.

4. A cylindrical generating hob for generating a spline shaft section of a predetermined length having a plurality of uniformly peripherally spaced longitudinal keys uniform in height and uniformly tapered in width, said hob comprising a plurality of generally longitudinal gashes and a helical groove intersecting said gashes to form a thread of constant lead and uniform height, the base of said thread being cylindrical, said thread comprising a plurality of convolutions of finishing teeth having relieved cutting edges at the top and both sides, one side of the thread having a long lead and being adapted to generate on a circle of one diameter, and the other side of the thread having a short lead and being adapted to generate on a circle of a smaller diameter than said first mentioned circle.

5. A generating hob for generating a spline shaft section of a predetermined length having a plurality of uniformly peripherally spaced longitudinal keys uniformly tapered in width, said hob comprising a plurality of generally longitudinal gashes and a helical groove intersecting said gashes to form a thread of constant lead, the base of said thread being cylindrical, said thread comprising a plurality of convolutions of finishing teeth having relieved cutting edges at the top and both sides, the opposite sides of said thread being adapted to generate on circles of different diameters and having respectively different uniform pressure angles, the tops of the teeth being formed along their side margins with raised clearance lugs.

6. A generating hob for generating a spline shaft section having a plurality of uniformly peripherally spaced longitudinal keys tapered in width, said hob comprising a plurality of generally longitudinal gashes and a helical groove intersecting said gashes to form a thread of constant lead, said thread comprising a plurality of convolutions of finishing teeth having relieved cutting edges at the top and both sides and having respectively different constant pressure angles on opposite sides, one side of the thread having a long lead and being adapted to generate the final form of said section on a circle of one diameter, and the other side of the thread having a short lead and being adapted to generate the final form of said section on a circle of smaller diameter than said one circle.

7. A generating hob for a spline shaft having a plurality of peripherally spaced keys longitudinally tapered in width, said hob comprising a helical thread which consists of a series of finishing teeth each adapted to form part of the final contour on the shaft, and which tapers in width at a cylindrical reference surface intersecting said thread and coaxial with the hob with opposite sides adapted to generate respectively on circles of different diameters, said opposite sides having respectively different uniform pressure angles from end to end.

8. The method of hobbing a spline shaft with elongated, generally longitudinal, peripherally spaced keys, said method comprising simultaneously generating the opposite sides of each key with surfaces of different leads relative to the axis of rotation by rolling said sides relative to the hob respectively on two different generating circles.

9. The method of hobbing a generally longitudinal key on a spline shaft which method comprises simultaneously generating the opposite sides of the key with right hand and left hand helicoidal surfaces respectively relative to the axis of rotation by rolling said sides relative to the hob respectively on two different generating circles, whereby to impart a longitudinal wedge shape to the key.

JOHN EDGAR.